Figure 1:
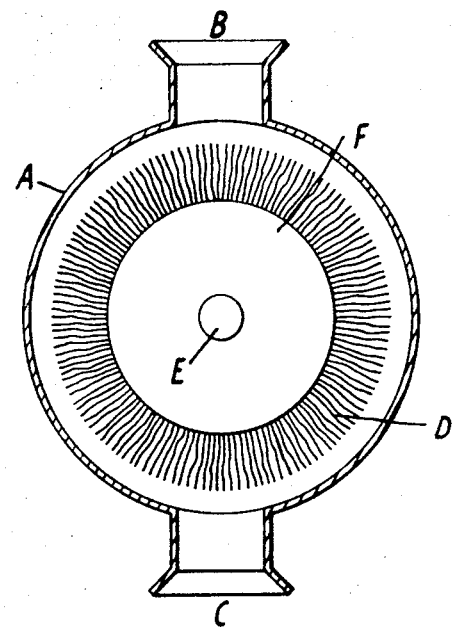

United States Patent [19]
Palmer

[11] 3,754,929
[45] Aug. 28, 1973

[54] MALTING PROCESS

[75] Inventor: Godfrey Henry Oliver Palmer, Crawley, England

[73] Assignee: Brewing Patents Limited, London, England

[22] Filed: June 8, 1970

[21] Appl. No.: 44,410

[30] Foreign Application Priority Data
June 11, 1969  Great Britain.................... 29,706/69

[52] U.S. Cl............................ 99/50, 99/53, 195/70, 195/71
[51] Int. Cl............................................. C12c 1/02
[58] Field of Search........................... 99/50, 51, 53; 195/70, 129, 130, 131; 146/221.8, 221.9

[56] References Cited
UNITED STATES PATENTS
1,914,244  6/1933  Dixon .................................. 195/70
3,317,402  5/1967  Smith et al........................ 195/70 X

OTHER PUBLICATIONS

MacLeod, et al., Effects of Gibberellic Acid on Barley Endosperm, Institute of Brewing Journal, Vol. 68, 1962 (pp. 322-332) TP500I79

Cook, A. H., Barley and Malt. Academic Press, N.Y. 1962, (pp. 293-295 & 312-316) SB191B2C6C.2

*Primary Examiner*—David M. Naff
*Attorney*—Wenderoth, Lind and Ponack

[57] ABSTRACT

In the conversion of barley to malt the distal end of the individual grains is selectively abraded to permit access of exogenous gibberellic acid to the aleurone layer at positions remote from the germ. The abrasion is carried out to such extent as to permit the above result without splitting the husk of an unduly large proportion of the grains. A weight reduction of 0.2% is usually sufficient.

3 Claims, 3 Drawing Figures

Godfrey Henry Oliver Palmer,
INVENTOR

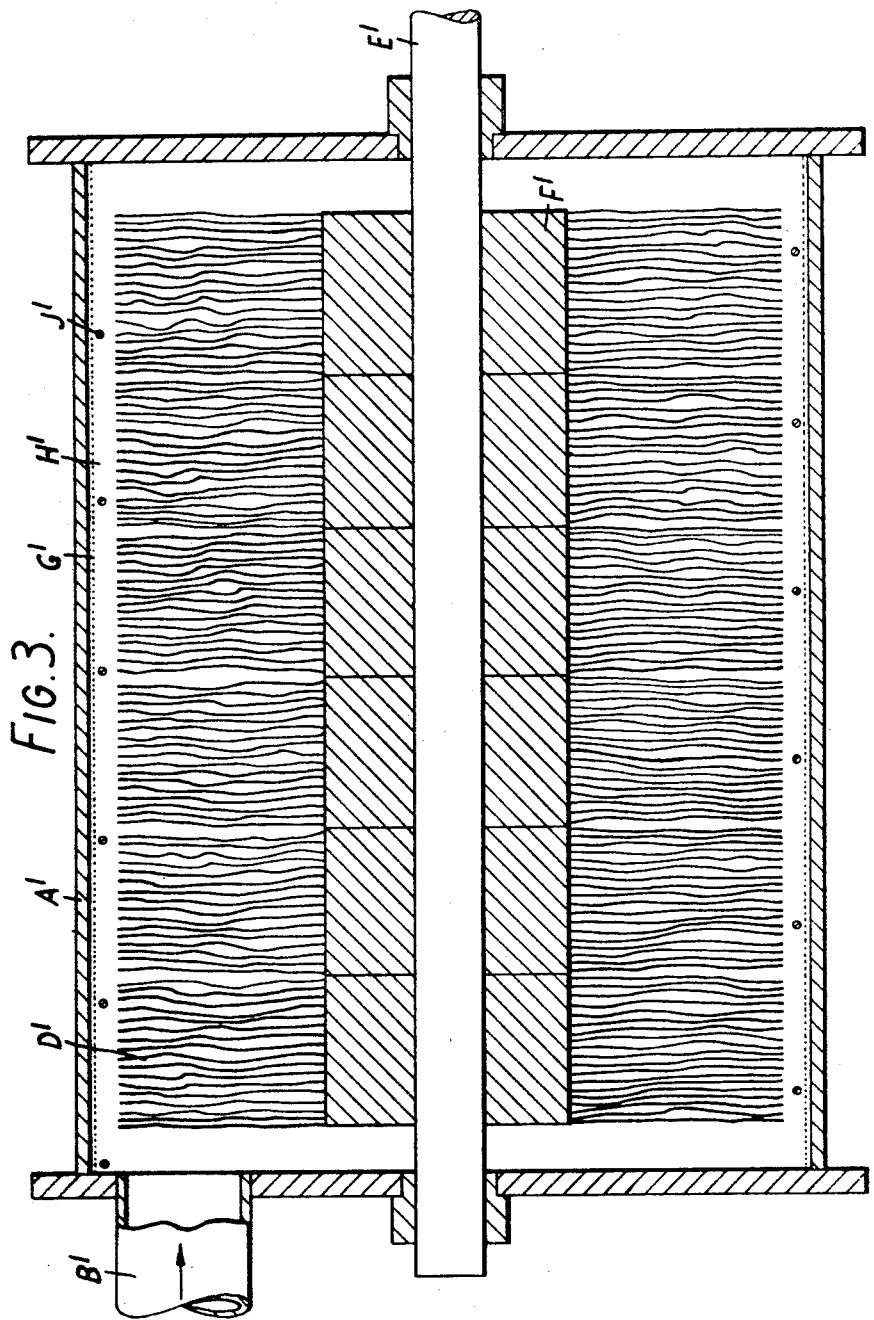

3,754,929

MALTING PROCESS

The present invention relates to the production of malt.

In conventional malting procedures, the first step in the conversion of barley into malt is effected by steeping the barley in water, usually under selected conditions, with the object of securing the uptake by the barley of sufficient water to initiate the natural germination of the seed. Often, according to particular circumstances, the supply of water is supplemented at a later stage.

It is known that amongst the desirable changes which occur in malting are changes in the endosperm of the barley which are brought about by the action of enzymes. It is known that the relevant enzymes, particularly α-amylase, which in addition form a valuable feature of the malted grain, are mostly formed during the period of growth which follows germination during the malting process.

It is further believed that the conventional malting process depends upon the action of the embryo following its germination. Thus the changes already mentioned are first apparent in that part of the endosperm adjacent to the embryo and then progess along the main axis of the grain towards the distal end. It is moreover known that this progressive change does not to a major extent result from the direct formation of enzymes by the embryo. It is known that, on the contrary, the formation of the enzymes results only indirectly from the growth of the embryo. The effect is in fact due to the production by the embryo of substances which induce enzyme formation in the layer of aleurone cells which surrounds the bulk of the endosperm and which is located beneath the visible outer layers. The stimulatory substances include gibberellins and moreover externally applied gibberellic acid can be used to enhance the rate of enzyme formation.

When gibberellic acid is applied externally, however, it reaches the aleurone cells by transport through the growing embryo. We have found that the pericarp, which underlies the husk and is one of the external coverings of the endosperm, is impermeable to gibberellic acid. Direct access of externally applied gibberellic acid to the aleurone cells is thus impossible or at least very much limited so long as the pericarp remains undamaged. It is a consequence that when exogenous gibberellic acid is applied to intact grain, malting follows the normal pattern, changes in the endospern starting close to the embryo and proceeding along the corn to the distal end. Although malting rate is somewhat stimulated, it is limited by the need for (a) embryo growth, (b) the subsequent transport of gibberellic acid to the aleurone cells to induce the formation of enzymes and (c) the diffusion of the enzymes throughout the grain. It will be appreciated therefore that the use of exogenous gibberellic acid assists the normal consequence of the growth of the embryo by making available to the grain an additional amount of stimulus. It is important to appreciate however that although the amount of stimulatory agent is in this manner increased, the route by which it exerts its effect remains unchanged. It is indeed for this reason that, the pattern of change in the endosperm relative to the location of the embryo remains unchanged. It appears that the aleurone cells which are located near to the embryo receive additional stimulus from the use of exogenous gibberellic acid, while cells more remote from the embryo normally receive no substantially greater stimulus for the reason that the gibberellic acid follows the same route to the receptive aleurone cells as does gibberellic acid and related substances produced by the embryo.

Malting may be accelerated by direct penetration of externally applied gibberellic acid, and other stimulants, to the aleurone cells. It is already known that this acceleration can be achieved by procedures which lead to the death of the embryo, but the advantages of these procedures are limited in that they eliminate the valuable action of the embryo in producing stimulatory substances. It is also known that accelerated malting can be achieved by processes which involve removal of large quantities of husk (5 - 12 percent of the weight of the grain), but again processes of the latter type suffer from the disadvantage that the malt produced is unsuitable for use in extraction processes where intack husk is needed to form a filter bed, as is conventional in the production of brewers wort from malt. The known process suffers from the further disadvantage that, because of the extensive damage resulting from the dehusking treatment, large quantities of sugars and starch leak from the grains and bind the mass of grains into a cake during the final drying operation. The present process however secures the desired acceleration of malting without significantly altering the characteristics of the malt corn in these respects. The pericarp of barley has a waxy outer surface on an underlying cellulosic layer. It is believed that it is the waxy material on the outer surface of the pericarp which is impervious to gibberellic acid and that abrasion or scarification of the pericarp will result in fissures, which will permit gibberellic acid to diffuse through it and into the aleurone cells.

The present invention consists in subjecting barley to controlled mechanical treatment arranged to abrade the surface of the pericarp at the distal end of the grain to a sufficient extent to admit exogenous gibberellic acid to the permeable underlying tissues. As a result of the mechanical treatment the externally applied gibberellic acid reaches underlying aleurone cells, which would under normal conditions be less accessible to it, and enzyme formation is thus stimulated in aleurone cells remote from the embryo. Very soon after treatment with gibberellic acid the process of malting thus commences in a region which is normally the last to become malted. The limited abrasion of the pericarp at the distal end of the grain in no way damages the embryo so that the degeee of malting resulting from the activity of the embryo remains unchanged. Furthermore, as the pericarp alone is abraded, the underlying testa prevents access of microorganisms to the endosperm and their undesirable growth on this tissue. The upper limit of the amount of husk that should be removed is set by the requirement that, whilst it is desired to remove sufficient husk at the distal end of the grain to permit the pericarp to be abraded as explained above, it is not desired to split the husks so that they become removed from the grains. The maximum quantity of husk removed for most varieties of barley is preferably not more than 2 percent of the grain weight and may be as little as 0.1 percent. More preferably the quantity of husk removed is less than 1.2percent of the grain weight and for most purposes a reduction of 0.2 percent is perfectly satisfactory. The final malt can be used in brewing in a conventional manner, for there is no appreciable reduction in the degree to which residual husk or "spent grain," as it is often described, serves to establish a filter bed. The process thus accelerates the rate of malting and yet produces conventional malt or alternatively malts of special composition.

It is a particular feature of the invention to provide a mechanical process by which the required degree and location of abrasion can be brought about.

The husk of the individual grains of barley is thicker at the embryo end of the grain and is extremely thin at the distal end of the grain, so that any process, which leads to the selective abrasion of the distal end of the grains, can result in the desired abrasion of the pericarp without splitting the husks of an excessive number of grains. As a result the husks of the malted grains are available to form a filter bed in the conventional manner to effect filtration of the wort at the end of the mashing operation.

The individual grains of barley are asymmetrical, being somewhat more pointed at the embryo end. If barley is transported along a curved path, the outer periphery of which is formed by an abrasive surface, it is found that the grains undergo selective abrasion at the distal end. The amount of this abrasion is dependent upon a number of factors, particularly upon the nature of the abrasive surface, the length of the path and the velocity of the grains and by varying one or more of these variables the desired amount of husk can be removed.

Figure 2:
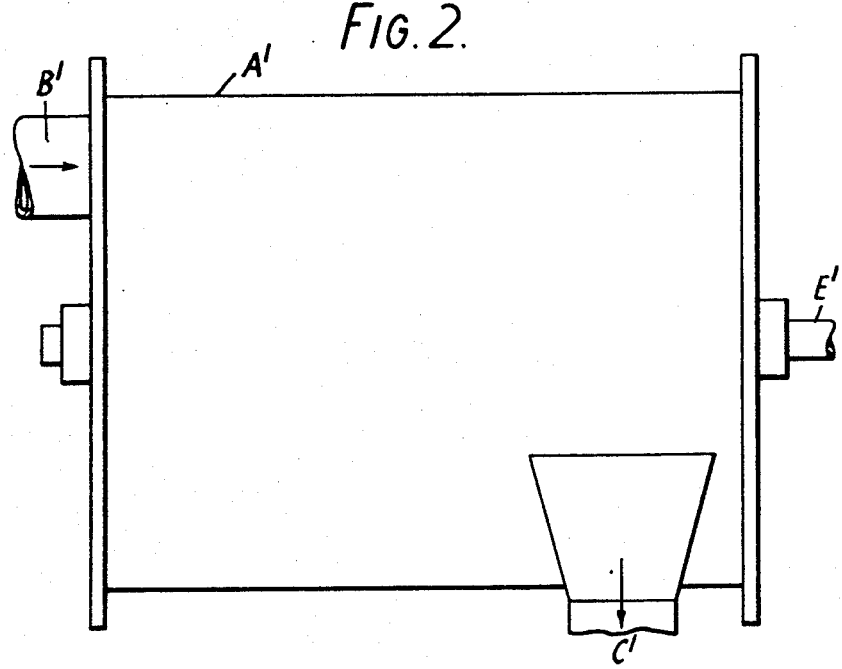

One simple form of apparatus for carrying out the abrasion step of the invention is illustrated in FIGS. 1 and 2. FIG. 1 represents a cross-section through an apparatus which consists essentially of a cylindrical body A enclosed by fixed end plates and with an inlet opening B into which can be fed the barley to be treated and a second opening C which forms an exit for the treated barley together with dust produced by the abrasion. The abrasion is brought about by the action of a rotor D mounted on a cylinder F and rotatable by means of the spindle E. The function of the rotor D is to set up a flow of air in the space between itself and the inner surface of body A and to impel individual grains agains the body A. The space between rotor D and the cylindrical inner surface of body A is large in relation to the size of individual grains. The rotor D may consist of a brush formed of wires or other rigid material projecting radially from the whole surface of cylinder F and of such a length (which may conveniently be of the order of 2.5 cm.), that the clearance between the outer periphery of the rotor D and the internal surface of the body A is of the order of 0.7 cm. or more. The internal surface of the body is conveniently constructed to provide an abrading surface. It is believed that in many circumstances the requisite degree of abrasion may be achieved without treating the inner surface of the body in any specific manner apart from the machining which it would normally receive during fabrication. However, it is preferable to provide an abrasive lining, such as carborundum. As an alternative, indentations or raised spots in a regularly spaced arrangement on the inner surface of the body may provide the desired roughening. In either case the object is to provide a surface having an action akin to that of a domestic vegetable grater, a nutmeg grater or of sandpaper, the abrasive lining being arranged to be readily replaceable should the need arise.

In operating the illustrated apparatus, a charge of grain is fed in through the inlet B and is then passed around the casing for a predetermined number of times before removal through outlet C at the bottom of the casing. Means (not shown) are provided for closing inlet B and outlet C whilst the apparatus is in use.

It will be appreciated that the treatment of barley to secure local abrasion at the distal end of the individual grains may be carried out in many ways which, though differing in mechanical details, bring about the same kind of abrading action on the barley. In the illustrated form of apparatus the opening C, from which the treated barley is withdrawn, is approximately vertically beneath the opening B so that in this particular form the barley moves largely in a circular path in one plane. Another form of apparatus is illustrated in FIGS. 2 and 3 which are respectively a front view and a longitudinal section of the apparatus. In this apparatus the distance between the front and rear end plates of the body A' relative to its cross-sectional area is large. The inlet and outlet openings B' and C' are located at or near the opposite ends of the axis represented by the spindle E', supporting the brush D'. The apparatus in use is arranged so that there is a flow of air in through inlet B and out through outlet C. As a result the grains are moved progressively axially along the casing in addition to their movement around the periphery of the casings under the action of the brush D', so that they follow a helical path during which they undergo abrasion. In this apparatus it is possible to maintain and treat a continuous flow of barley in the apparatus. As in the apparatus of FIG. 1, the brush is carried on a cylinder F', the grain moving in the annular space H' between the periphery of the brush D' and the abrasive surface. The abrasive surface is preferably provided by a layer of a flexible abrasive material G', held in position by spring retainers J'.

It is emphasised that the abovementioned forms of apparatus are described by way of example only and other forms of apparatus may be provided for selectively abrading the distal end of the grain. Rapid impactively abrading the distal end of the grain. Rapid impaction of the grains without the use of additional abrasive surfaces also effect some damage to the pericarp layer thus facilitating the entry of exogenous gibberellic acid into the grains. Furthermore shaking of the barley grains with sand results in scarification of the pericarp layer at the distal end of the grain thus avoiding the exclusion of exogenous gibberellic acid from that region. These procedures are however less desirable by either leading to non-specific damage (i.e. not confined to the distal end) to the pericarp or introducing the obvious difficulty of subsequently separating the treated grain from the sand or other abrasive material employed. In using the present process, the degree of abrasion of the grain, temperature, aeration and duration of steeping and growth periods is adjusted according to the type or variety of barley being handled. "Flinty" barley may require a greater degree of abrasion than "mealy" barley grains because their covering layers are often more resistant.

Rapid assessment of the effectiveness of the abrasion process on the progression of enzymic modification can be made by applying pressure with the thumb at the distal end of the grain after a growing period of three days. The relative degree of malting may be judged from the consistency or softness of the end of the grain.

It will be appreciated that the abraded barley is superior to the untreated material in that it may be converted to malt in a shorter steeping and growth schedule by treatment with gibberellic acid. The resultant malt yields equal or greater amounts of brewers' extract and carbohydrates than normal salt. Brewing worts made from malts, produced from abraded barley and normal barley respectively show that the worts from abraded barley malts have a greater percentage of fermentable sugar in addition to larger quantities of amino nitrogen.

Malts from abraded grains allow larger quantities of unmalted adjuncts to be used in brewing because their content of α-amylase is higher than that of malts produced by conventional quick-growth methods. When the same quantity of carbohydrate adjuncts (20 or 30 percent) is added to mashes of "abraded" and "normal" malts the worts from "abraded" malts afford a superior degree of fermentability (attenuation). By reason of the greater α-amylase content of the abraded malt, there is a more complete conversion in mashing process of the carbohydrate content of the unmalted ajdunct into fermentable sugars. Indeed it is found in some instances that up to 50 percent adjuncts may be employed with the malts produced by the present invention.

The manner in which gibberellic acid treatment can be applied to the abraded barley can vary with advantage and is selected according to the behaviour of the particular sample of barley which is undergoing malting. Thus the gibberellic acid can be dissolved in the steeping liquor to ensure rapid entry into the grain Alternatively and preferably, during the period when germination is beginning, a period which is sometimes referred to as the "chitting period," the gibberellic acid solution can be applied as a spray to ensure continued stimulation of the aleurone cells while at the same time providing adequate moisture on the surface of the grain. It is clear that the present process of controlled abrasion does not fissure the aleurone layer thereby allowing the modified endosperm to leak onto the surface of the grain and thus encouraging bacterial and fungal infection during malting. Test of controlled abrasions were carried out in both forms of apparatus described in which the amount of material abraded to about 0.2 percent of the initial weight of the barley which included several varieties, such as Hunter, Zephyr, Herta, Keina, Procter. The level of germination of the abraded grains was 97 percent, a value identical with that of the untreated barley. Root growth of abraded grains were never in excess of that of normal grains. The following Examples illustrate the invention.

EXAMPLE 1

Abraded (weight reduced by 0.2 percent) and normal barley were steeped at 16° or 20°C. in water for 8 hr., rested in air for 16 hr. and steeped again for 24 hr. at 16°C. Germination on the first day was at 16°C. or 20°C. and subsequent growth was at 16°C. Abraded grains germinated more rapidly than normal grains.

EXAMPLE 2

Abraded and normal barley were steeped in water at 16°C. as in Example 1 and gibberellic acid (0.1 ppm) was sprinkled in an amount of 1 litre per cwt. of barley after the 8 hr. and 24 hr. steeps. Subsequent growth was at 16°C.

The comparative results were as follows:

| Total Malting Time | H.W.E.* lb/Qr. | TSN⁺mg./ml. |
|---|---|---|
| Abraded: 6 days | 104.0 | 0.640 |
| Normal: 6 days | 102.0 | 0.600 |

\* Hot Water Extract in brewers' pounds per quarter.
⁺ Total Soluble Nitrogen

EXAMPLE 3

Abraded and normal barley were steeped in gibberellic acid solution (1.0 ppm) for 8 hr. at 16°C., rested in air for 16 hr. and resteeped for 24 hr. in water followed by sprinkling with a solution of gibberellic acid (0.125 ppm) in an amount of 1 litre per cwt. of barley.

Subsequent Examples show that smaller quantities of gibberellic acid can be equally effective when applied only as sprays to abraded grains.

The comparative results were as follows:

| Total Malting Time | H.W.E. lb./Qr. | TSN mg./ml. |
|---|---|---|
| Abraded: 6 days | 104.0 | 0.746 |
| Normal: 6 days | 101.0 | 0.590 |

EXAMPLE 4

Abraded and normal barley were steeped in water at 16°C. for 8 hr., rested in air for 16 hr. and resteeped for 4 hr. instead of 24 hr. Gibberellic acid solution (0.125ppm) was sprinkled after the steeping periods as in the preceding example. Steeping and growth were at 16°C. and a sprinkle of water was administered on the 2nd and/or 3rd and/or 4th day of total processing depending on the water status of the variety of barley being used.

The comparative results were as follows:

| Total Malting Time | H.W.E. lb./Qr. | TSN mg./ml. |
|---|---|---|
| Abraded: 5 days | 101.4 | 0.744 |
| Normal: 5 days | 95.1 | 0.566 |

EXAMPLE 5

Abraded and normal barley were treated as in Example 4 but aeration was effected continuously during both steeping periods to bring about maximal metabolic efficiency of the enzyme-producing aleurone cells and the germinating embryo. The effect of the abrasion treatment is clear from the following figures:

| Total Malting Time | H.W.E. lb./gr. | T.S.N. mg./ml. |
|---|---|---|
| Abraded: 6 days | 104.0 | 0.726 |
| Normal : 6 days | 97.0 | 0.570 |

EXAMPLE 6

Abraded and normal barley were treated as in Example 5 but the second steep in water was extended for 4 hr. to 8 hr. to accommodate for varietal differences in rates of water absorption and/or retention.

The comparative results were as follows:

| Total Malting Time | H.W.E. lb./Qr. | T.S.N. mg./ml. |
|---|---|---|
| Abraded: 5 days | 103.8 | 0.783 |
| Normal : 6 days | 100.1 | 0.668 |

It will be seen that the use of abraded barley has resulted in an acceleration of the malting process by one day, whilst the amount of fermentable material and soluble nitrogen extracted during subsequent mashing is improved.

EXAMPLE 7

Abraded and normal barley were treated as in Example 5 but the temperature of the first steep was 20°C. instead of 16°C. The results were as follows:

| Total Malting Time | H.W.E. lb./Qr. | T.S.N. mg./ml |
|---|---|---|
| Abraded: 5 days | 104.7 | 0.727 |
| Normal : 6 days | 97.0 | 0.579 |

EXAMPLE 8

Abraded and normal barley were treated as in Example 7, but the first day of growth was at 20°C. and, to reduce normal root growth, resteeping on the second day of growth was in warm water (40°C. falling to 34°C.) for 1.5 hr. Excess water was driven from the surface of the grains by increasing the flow of air through the grains. Alternatively, the warm water steep on the second day was replaced by saturating the grains with water and, after draining, warm air (40°–45°C.) was forced through the bed of grains to reduce root growth. The following results were obtained:

| Total Malting Time | H.W.E. lb./Qr. | T.S.N. mg./ml. |
|---|---|---|
| Abraded: 5 days | 103.0 | 0.875 |
| Normal : 6 days | 100.9 | 0.657 |

In all the above examples the abraded barley employed had been treated in the described apparatus under conditions such as to reduce the weight of the grain by 0.2 percent. Visual inspection of the individual grains under the microscope showed that the great majority of the grains had undergone some abrasion of the husk in a restricted area at and around the distal end of the grain.

EXAMPLE 9

In order to examine the effects, greater removal of husk was employed. This showed that removal of husk and pericarp in excess of 0.2 percent of the weight of the grain, affords more rapid malting and may be achieved without damage to the embryo or its overlying husk. The maintenance of a visable embryo is important for the synthesis of sucrose and natural gibberellic acid while the intact overlying husk is especially important for maintaining the structural integrity of the grain during malting and as a filter bed during the mashing process. The effect is clear from the following table:

| *Per cent removal of Husk and Pericarp | H.W.E. lb./Qr.[+] | α-Amylase Content |
|---|---|---|
| Normal grain = 0.0% | 102.0 | 200 IDC units |
| Abraded = 0.2% | 103.5 | 250 |
| Abraded = 0.4% | 104.0 | 300 |
| Abraded = 0.65% | 105.0 | 540 |
| Abraded = 0.75% | 105.9 | 560 |
| Abraded = 0.81% | 106.0 | 560 |
| Abraded = 0.92% | 106.0 | 560 |
| Abraded = 1.00% | 105.8 | 600 |
| Abraded = 1.08% | 106.5 | 600 |
| Abraded = 1.17% | 106.0 | 720 |

[+]Malting process as in Example 2.
I.D.C. = Iodine Dextrin Colour.

I claim:

1. In a method of malting barley which comprises steeping the barley in water, the improvement wherein grains of barley are abraded sufficiently for removing both the husk and pericarp at the distal end only of the grains without shattering the remainder of the husk, to render the pericarp permeable to gibberellic acid at the distal end of the grain, and the abraded grains are treated with a solution of gibberellic acid during and/or after steeping in the water.

2. A method according to claim 1 in which the weight of the grain is reduced by 0.1 – 1.0 percent during the abrasion treatment.

3. A method according to claim 1 in which the abrasion of the distal end of the husk and of the pericarp of the grains is achieved by moving the barley in an arcuate path having a width greater than the size of the grains and defined between a rotor and a surrounding cylindrical casing, having an abrasive inner surface.

* * * * *